United States Patent
Norouzi et al.

(10) Patent No.: US 11,699,074 B2
(45) Date of Patent: *Jul. 11, 2023

(54) TRAINING SEQUENCE GENERATION NEURAL NETWORKS USING QUALITY SCORES

(71) Applicant: Google LLC, Mountain View, CA (US)

(72) Inventors: Mohammad Norouzi, Sunnyvale, CA (US); William Chan, Markham (CA); Sara Sabour Rouh Aghdam, Toronto (CA)

(73) Assignee: Google LLC, Mountain View, CA (US)

( * ) Notice: Subject to any disclaimer, the term of this patent is extended or adjusted under 35 U.S.C. 154(b) by 698 days.

This patent is subject to a terminal disclaimer.

(21) Appl. No.: 16/746,654

(22) Filed: Jan. 17, 2020

(65) Prior Publication Data
US 2020/0151567 A1    May 14, 2020

Related U.S. Application Data

(63) Continuation of application No. 16/421,406, filed on May 23, 2019, now Pat. No. 10,540,585.

(Continued)

(51) Int. Cl.
*G06N 3/08* (2006.01)
(52) U.S. Cl.
CPC ..................... *G06N 3/08* (2013.01)
(58) Field of Classification Search
CPC ........ G06N 3/08; G06N 3/0481; G06N 3/003; G06N 3/0445; G06N 3/0454
See application file for complete search history.

(56) References Cited

U.S. PATENT DOCUMENTS 8,775,341 B1   7/2014  Commons et al.
9,031,970 B1   5/2015  Das et al.
(Continued)

OTHER PUBLICATIONS

Abadi et al., "Tensorflow: A system for large-scale machine learning" 12th {USENIX} Symposium on Operating Systems Design and Implementation ({OSDI} 16), Savannah, GA, US, Nov. 2-4, 2016, 21 pages.

(Continued)

*Primary Examiner* — Jonathan A Bui
*Assistant Examiner* — Kidest Mendaye
(74) *Attorney, Agent, or Firm* — Fish & Richardson P.C.

(57) ABSTRACT

Methods, systems, and apparatus, including computer programs encoded on computer storage media, for training a sequence generation neural network. One of the methods includes obtaining a batch of training examples; for each of the training examples: processing the training network input in the training example using the neural network to generate an output sequence; for each particular output position in the output sequence: identifying a prefix that includes the system outputs at positions before the particular output position in the output sequence, for each possible system output in the vocabulary, determining a highest quality score that can be assigned to any candidate output sequence that includes the prefix followed by the possible system output, and determining an update to the current values of the network parameters that increases a likelihood that the neural network generates a system output at the position that has a high quality score.

20 Claims, 6 Drawing Sheets

Related U.S. Application Data

(60) Provisional application No. 62/675,733, filed on May 23, 2018.

(56) References Cited

U.S. PATENT DOCUMENTS

| | | | |
|---|---|---|---|
| 9,653,093 B1* | 5/2017 | Matsoukas | G10L 15/16 |
| 2005/0043947 A1 | 2/2005 | Roth et al. | |
| 2005/0043949 A1 | 2/2005 | Roth et al. | |
| 2007/0038453 A1* | 2/2007 | Yamamoto | G10L 13/08 |
| | | | 704/E15.021 |
| 2009/0144049 A1 | 6/2009 | Haddad et al. | |
| 2015/0127337 A1* | 5/2015 | Heigold | G06N 3/0454 |
| | | | 704/232 |
| 2016/0171974 A1* | 6/2016 | Hannun | G06N 3/084 |
| | | | 704/232 |
| 2016/0307564 A1 | 10/2016 | Sethy et al. | |
| 2016/0372118 A1* | 12/2016 | Senior | G06N 3/0445 |
| 2016/0372119 A1* | 12/2016 | Sak | G06N 3/0445 |
| 2017/0032241 A1* | 2/2017 | Corrado | G16H 50/30 |
| 2017/0185581 A1 | 6/2017 | Bojja et al. | |
| 2017/0270407 A1 | 9/2017 | Alberti et al. | |
| 2017/0323636 A1 | 11/2017 | Xiao et al. | |
| 2018/0075343 A1* | 3/2018 | van den Oord | G10L 15/16 |
| 2018/0247639 A1 | 8/2018 | Lui et al. | |
| 2018/0307745 A1 | 10/2018 | Bachrach et al. | |
| 2019/0130251 A1 | 5/2019 | Lao et al. | |
| 2019/0155905 A1 | 5/2019 | Bachrach et al. | |
| 2019/0205748 A1 | 7/2019 | Fukuda et al. | |
| 2019/0213284 A1 | 7/2019 | Anand et al. | |
| 2019/0258918 A1 | 8/2019 | Wang et al. | |

OTHER PUBLICATIONS

Bahdanau et al., "An Actor-Critic Algorithm for Sequence Prediction" ICLR, 2017, 17 pages.
Bahdanau et al., "End-to-end attention-based large vocabulary speech recognition." 2016 IEEE international conference on acoustics, speech and signal processing (ICASSP). IEEE, Mar. 20, 2016, 8 pages.
Bahdanau et al., "Neural machine translation by jointly learning to align and translate" ICLR, 2015, 15 pages.
Bahdanau et al., "Task Loss Estimation for Sequence Prediction" ICLR Workshop, 2016, 13 pages.
Baumel, T. et al. (Jan. 25, 2018). "Query focused abstractive summarization: Incorporating query relevance, multi-document coverage, and summary length constraints into seq2seq models." arXiv preprint arXiv:1801.07704 (2018). (Year: 2018).
Bengio et al., "Scheduled sampling for sequence prediction with recurrent neural networks." Advances in Neural Information Processing Systems, 2015, 9 pages.
Bhatia, S. et. al. (Mar. 19, 2016). "Automated correction for syntax errors in programming assignments using recurrent neural networks." arXiv preprint arXiv:1603.06129 (2016). (Year: 2016).
Britz et al., Massive Exploration of Neural Machine Translation Architectures. arXiv:1703.03906, Mar. 11, 2017, 9 pages.
Chan et al., "Latent Sequence Decompositions" ICLR, 2017, 12 pages.
Chan et al., "Listen, Attend and Spell: A neural network for large vocabulary conversational speech recognition." 2016 IEEE International Conference on Acoustics, Speech and Signal Processing (ICASSP). IEEE, Mar. 20, 2016, 16 pages.
Chang et al., "Learning to Search Better Than Your Teacher" in ICML, 2015, 9 pages.
Cheng et al., "Convergence of value aggregation for imitation learning" arXiv preprint arXiv:1801.07292, 2018, 22 pages.
Chiu et al., "State-of-the-art speech recognition with sequence-to-sequence models." 2018 IEEE International Conference on Acoustics, Speech and Signal Processing (ICASSP). IEEE, 2018, 5 pages.
Cho et al., "Learning phrase representations using RNN encoder-decoder for statistical machine translation" arXiv preprint arXiv:1406.1078, 2014, 15 pages.
Chorowski et al., "Towards better decoding and language model integration in sequence to sequence models" arXiv preprint arXiv:1612.02695, 2016, 6 pages.
Collobert et al., "Wav2letter: an end-to-end convnet-based speech recognition system." arXiv preprint arXiv:1609.03193, 2016.
Daume et al., "Search-based structured prediction." Machine learning 75.3, Jun. 1, 2009, 29 pages.
Daume III et al., "Learning as search optimization: Approximate large margin methods for structured prediction." Proceedings of the 22nd international conference on Machine learning. ACM, Aug. 7, 2005.
Ding et al., "Cold-start reinforcement learning with softmax policy gradient" Advances in Neural Information Processing Systems, 2017, 10 pages.
Edunov et al., "Classical structured prediction losses for sequence to sequence learning" arXiv preprint arXiv:1711.04956 Nov. 14, 2017, 10 pages.
Elbayad et al., "Token-level and sequence-level loss smoothing for RNN language models" arXiv preprint arXiv:1805.05062 May 14, 2018, 16 pages.
Feng, X. et al. (Dec. 2017). "Multi-level cross-lingual attentive neural architecture for low resource name tagging." Tsinghua Science and Technology 22.6 (2017): 633-645. D01:10.23919/TST.2017.8195346 (Year: 2017).
Gehring et al., "Convolutional sequence to sequence learning." Proceedings of the 34th International Conference on Machine Learning—vol. 70. JMLR. org, Aug. 6, 2017, 15 pages.
Glorot et al., "Understanding the difficulty of training deep feedforward neural networks." Proceedings of the thirteenth international conference on artificial intelligence and statistics, Mar. 31, 2010, 8 pages.
Goodman et al., "Noise reduction and targeted exploration in imitation learning for abstract meaning representation parsing." Proceedings of the 54th Annual Meeting of the Association for Computational Linguistics (vol. 1: Long Papers), Aug. 2016, 11 pages.
Graves et al., "Towards end-to-end speech recognition with recurrent neural networks." International conference on machine learning, Jan. 27, 2014, 9 pages.
Hassan et al., "Achieving human parity on automatic chinese to english news translation." arXiv preprint arXiv:1803.05567, Mar. 15, 2018, 25 pages.
Hinton et al., "Distilling the knowledge in a neural network." arXiv preprint arXiv:1503.02531, Mar. 9, 2015, 9 pages.
Hochreiter et al., "Long short-term memory." Neural computation 9.8, Nov. 15, 1997, 32 pages.
Karita et al., "Sequence training of encoder-decoder model using policy gradient for end-to-end speech recognition." 2018 IEEE International Conference on Acoustics, Speech and Signal Processing (ICASSP). IEEE, Apr. 15, 2018, 5 pages.
Kim et al., "Joint CTC-attention based end-to-end speech recognition using multi-task learning." 2017 IEEE international conference on acoustics, speech and signal processing (ICASSP). IEEE, Mar. 5, 2017, 5 pages.
Koehn et al., "Moses: Open source toolkit for statistical machine translation" Proceedings of the 45th annual meeting of the ACL on interactive poster and demonstration sessions, Jun. 2007, 4 pages.
Lam Ple, G. et al. (Apr. 7, 2016). "Neural architectures for named entity recognition." arXiv preprint arXiv:1603.01360 (2016). (Year: 2016).
Leblond et al. "SEARNN: Training RNNs with global-local losses." arXiv preprint arXiv:1706.04499, Jun. 14, 2017, 16 pages.
Levenshtein, Vladimir I. "Binary codes capable of correcting deletions, insertions, and reversals." Soviet physics doklady. vol. 10. No. 8. 1966.
Liang et al., "Learning noise-invariant representations for robust speech recognition." 2018 IEEE Spoken Language Technology Workshop (SLT). IEEE, Dec. 18, 2018, 11 pages.
Liptchinsky et al., "Based speech recognition with gated ConvNets." arXiv preprint arXiv:1712.09444, Dec. 22, 2017, 10 pages.

(56) References Cited

OTHER PUBLICATIONS

Liu et al., "Gram-CTC: Automatic unit selection and target decomposition for sequence labelling." Proceedings of the 34th International Conference on Machine Learning—vol. 70. JMLR. org, Aug. 6, 2017, 10 pages.
Liu, J. et al. (2015). "Mining quality phrases from massive text corpora." Proceedings of the 2015 ACM SIGMOD International Conference on Management of Data. ACM, 2015, (Year: 2015).
Ma et al., "Softmax q-distribution estimation for structured prediction: A theoretical interpretation for raml." arXiv preprint arXiv:1705.07136, May 19, 2017, 23 pages.
Ma, X. et al. (May 26, 2016). "End-to-end sequence labeling via bi-directional lstnn-cnns-crf." arXiv preprint arXiv:1603.01354 (2016). (Year: 2016).
Mnih et al., "Human-level control through deep reinforcement learning." Nature 518.7540, 2015, 13 pages.
Norouzi et al., "Reward augmented maximum likelihood for neural structured prediction." Advances in Neural Information Processing Systems, 2016, 9 pages.
Panayotov et al., "Librispeech: an ASR corpus based on public domain audio books." 2015 IEEE International Conference on Acoustics, Speech and Signal Processing (ICASSP). IEEE. Apr. 19, 2015, 5 pages.
Paul et al., "The design for the Wall Street Journal-based CSR corpus." Proceedings of the workshop on Speech and Natural Language. Association for Computational Linguistics, Feb. 23, 1992, 6 pages.
PCT International Search Report and Written Opinion in International Appln. No. PCT/US2019/033849, dated Sep. 18, 2019, 14 pages.
Pereyra et al., "Regularizing neural networks by penalizing confident output distributions." arXiv preprint arXiv:1701.06548, Jan. 23, 2017, 12 pages.
Pham, T.-H. et al. (2017). "End-to-end recurrent neural network models for vietnannese named entity recognition: Word-level vs. character-level." International Conference of the Pacific Association for Computational Linguistics. Springer, Singapore, 2017, (Year : 2017).
Post, M. et al. (Apr. 18, 2018). "Fast lexically constrained decoding with dynamic beam allocation for neural machine translation." arXiv preprint arXiv:1804.06609 (2018). (Year: 2018).
Povey et al., "The Kaldi speech recognition toolkit." IEEE 2011 workshop on automatic speech recognition and understanding. No. Conf. IEEE Signal Processing Society, 2011, 4 pages.
Prabhavalkar et al., "Minimum word error rate training for attention-based sequence-to-sequence models." 2018 IEEE International Conference on Acoustics, Speech and Signal Processing (ICASSP). IEEE, Apr. 15, 2018, 5 pages.
Ranzato et al., "Sequence level training with recurrent neural networks." arXiv preprint arXiv:1511.06732, Nov. 20, 2015, 16 pages.
Rennie et al., "Self-critical sequence training for image captioning." Proceedings of the IEEE Conference on Computer Vision and Pattern Recognition, 2017, 17 pages.
Ross et al., "A reduction of imitation learning and structured prediction to no-regret online learning." Proceedings of the fourteenth international conference on artificial intelligence and statistics, Jun. 14, 2011, 9 pages.
Ross et al., "Reinforcement and imitation learning via interactive no-regret learning." arXiv preprint arXiv:1406.5979, Jun. 23, 2014, 14 pages.
Rush et al., "A neural attention model for abstractive sentence summarization." arXiv preprint arXiv:1509.00685, Sep. 2, 2015, 11 pages.
Rusu et al., "Policy distillation." arXiv preprint arXiv:1511.06295, Nov. 19, 2015, 13 pages.
Sennrich et al., "Neural machine translation of rare words with subword units." arXiv preprint arXiv:1508.07909, Aug. 31, 2015, 11 pages.

Serdyuk et al., "Twin Networks: Matching the future for sequence generation." arXiv preprint arXiv:1708.06742, Aug. 22, 2017, 12 pages.
Sidor, S. (Feb. 2016). "Reinforcement learning with natural language signals". Diss. Massachusetts Institute of Technology, 2016. (Year: 2016).
Sriram et al., "Cold fusion: Training seq2seq models together with language models" arXiv preprint arXiv:1708.06426, Aug. 21, 2017, 7 pages.
Sun et al., "Deeply aggrevated: Differentiable imitation learning for sequential prediction." Proceedings of the 34th International Conference on Machine Learning—vol. 70. JMLR. org, Aug. 6, 2017, 17 pages.
Sun et al., "Truncated horizon policy search: Combining reinforcement learning & imitation learning." arXiv preprint arXiv:1805.11240. May 29, 2018, 14 pages.
Sutskever et al., "Sequence to sequence learning with neural networks." Advances in neural information processing systems, 2014, 9 pages.
Sutton, Richard S., and Andrew G. Barto. "Reinforcement learning: An introduction." (2011).
Tjandra et al., "Sequence-to-sequence asr optimization via reinforcement learning." 2018 IEEE International Conference on Acoustics, Speech and Signal Processing (ICASSP). IEEE,Apr. 15, 2018, 5 pages.
Tran, N.H. et al. (Aug. 2017). "De novo peptide sequencing by deep learning." Proceedings of the National Academy of Sciences 114.31 (2017): 8247-8252. D01:10.1073/pnas.1705691114 (Year: 2017).
Vaswani et al., "Attention is all you need." Advances in neural information processing systems, 2017, 11 pages.
Vinyals et al., "Grammar as a foreign language." Advances in neural information processing systems, 2015, 9 pages.
Wang et al., "Switchout: an efficient data augmentation algorithm for neural machine translation." arXiv preprint arXiv:1808.07512, Aug. 22, 2018, 10 pages.
Wiseman et al., "Sequence-to-sequence learning as beam-search optimization." arXiv preprint arXiv:1606.02960, Jun. 9, 2016, 11 pages.
Wu et al., "Google's neural machine translation system: Bridging the gap between human and machine translation." arXiv preprint arXiv:1609.08144 Sep. 26, 2016, 23 pages.
Wu, Y. et al. (Oct. 8, 2016). "Google's neural machine translation system: Bridging the gap between human and machine translation." arXiv preprint arXiv:1609.08144 (2016). (Year: 2016).
Wuebker, J. et al. (2016). "Models and inference for prefix-constrained machine translation." Proceedings of the 54th Annual Meeting of the Association for Computational Linguistics (vol. 1: Long Papers). 2016. (Year: 2016).
Xu et al., "Show, attend and tell: Neural image caption generation with visual attention." International conference on machine learning, Jun. 1, 2015, 10 pages.
Yu, L. et al. (Sep. 26, 2016). "Online segment to segment neural transduction." arXiv preprint arXiv:1609.08194 (2016). (Year: 2016).
Yu, L. et al. (Mar. 6, 2017). The neural noisy channel. arXiv preprint arXiv:1611.02554 (2017). (Year: 2017).
Zeyer et al., "Improved training of end-to-end attention models for speech recognition." arXiv preprint arXiv:1805.03294, May 8, 2018.
Zhang et al., "Very deep convolutional networks for end-to-end speech recognition." 2017 IEEE International Conference on Acoustics, Speech and Signal Processing (ICASSP). IEEE, Mar. 5, 2017, 5 pages.
Zhong et al.,"Seq2sql: Generating structured queries from natural language using reinforcement learning." arXiv preprint arXiv:1709.00103 Aug. 31, 2017, 12 pages.
EP Office Action in European Appln. No. 19730630.1, dated Jul. 28, 2022, 9 pages.
International Preliminary Report on Patentability in International Application No. PCT/US2019/033849, dated Dec. 3, 2020, 8 pages.

\* cited by examiner

| | |
|---|---|
| Target sequence y* | a s _ h e _ t a l k s _ h i s _ w i f e |
| General sequence ỹ | a s _ e e _ t a l k s _ w h o s e _ w i f e |
| Optimal extensions for edit distance (OCD targets) | a s _ h e _ t a l k s _ h i i s _ _ w i f e<br>      h               h i   w<br>      _ |

FIG. 4

TRAINING SEQUENCE GENERATION NEURAL NETWORKS USING QUALITY SCORES

CROSS-REFERENCE TO RELATED APPLICATIONS

This is a continuation of U.S. application Ser. No. 16/421,406, filed on May 23, 2019, which claims priority to U.S. Provisional Application No. 62/675,733, filed on May 23, 2018. The disclosures of the prior applications are considered part of and are incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

This specification describes a system implemented as computer programs on one or more computers in one or more locations that trains a sequence generation neural network to generate output sequences conditioned on a network input.

In particular, the system trains the neural network using "optimal completion distillation." In optimal completion distillation, the system generates an output sequence using the sequence generation neural network and then trains the neural network using quality scores that measure the quality of candidate output sequences determined using prefixes within the generated output sequence relative to the ground truth output sequence that should have been generated by the neural network. This is in contrast to conventional techniques, e.g., Maximum Likelihood Estimation (MLE), in which the neural network is directly provided with prefixes from the ground truth output sequence as input.

The subject matter described in this specification can be implemented in particular embodiments so as to realize one or more of the following advantages.

By using quality scores in the training of the neural network as described in this specification, the system can train the neural network to have state-of-the-art performance on sequence generation tasks, e.g., speech recognition or another sequence generation task. In fact, the described optimal completion distillation technique has no hyperparameters and the neural network does not require any pre-training in order to achieve this level of performance, reducing how many computational resources are consumed by the overall training process. Additionally, by efficiently identifying the highest score for each position in the output sequence as described in this specification, the amount of computational resources required to perform the training is reduced. Thus, the described techniques allow a neural network to be trained to have state-of-the-art performance without excessive consumption of computational resources.

As particular examples of the performance that neural networks trained using the described techniques can achieve, Table 1 (illustrated in FIG. 6) shows the performance of training the same neural network using three different techniques, OCD (the technique described in this specification), scheduled sampling (SS), and MLE, on the same task: the Wall Street Journal speech recognition task. In particular, Table 1 shows the performance in terms of word error rate (lower word error rates represent better performance) of neural networks trained using these three approaches with various beam sizes. A beam size refers to the size of the beam that is used in beam search decoding to generate an output sequence during inference, i.e., after training. As can be seen from Table 1, the performance of the neural network when trained using OCD greatly exceeds the performance using the other two techniques, which were previously considered state of the art network training techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows an example of applying the OCD training technique when the quality metric is based on edit distance.

Like reference numbers and designations in the various drawings indicate like elements.

DETAILED DESCRIPTION

This specification describes a system implemented as computer programs on one or more computers in one or more locations that trains a neural network to generate output sequences conditioned on a network input.

The neural network can be configured to generate any of a variety of output sequences conditioned on any of a variety of network inputs.

For example, the neural network may be a machine translation neural network. That is, if the network input is a sequence of words in an original language, e.g., a sentence or phrase, the output sequence may be a translation of the input sequence into a target language, i.e., a sequence of words in the target language that represents the sequence of words in the original language.

As another example, the neural network may be a speech recognition neural network. That is, if the network input is a sequence of audio data representing a spoken utterance, the output sequence may be a sequence of graphemes, characters, or words that represents the utterance, i.e., is a transcription of the input sequence.

As another example, the neural network may be a natural language processing neural network. For example, if the network input is a sequence of words in an original language, e.g., a sentence or phrase, the output sequence may be a summary of the input sequence in the original language, i.e., a sequence that has fewer words than the input sequence but that retains the essential meaning of the input sequence. As another example, if the network input is a sequence of words that form a question, the output sequence can be a sequence of words that form an answer to the question.

As another example, the neural network may be part of a computer-assisted medical diagnosis system. For example, the network input can be data from an electronic medical record (which may in some examples include physiological measurements) and the output sequence can be a sequence of predicted treatments and/or a medical diagnosis.

As another example, the neural network may be part of an image processing system. For example, the network input can be an image and the output can be a sequence of text that describes the image. As another example, the network input can be a sequence of text or a different context and the output sequence can be an image that describes the context. As another example, the network input can be image, audio and/or video data and the output may be a sequence that defines an enhanced version of the data (for example, with reduced noise).

The neural network can have any of a variety of architectures. For example, the neural network can have an encoder neural network to encode the network input and a decoder neural network to generate the output sequence from the encoded network input. In some examples, the decoder is an auto-regressive neural network, e.g., a recurrent neural network or an auto-regressive convolutional neural network or an auto-regressive attention-based neural network.

Figure 1:
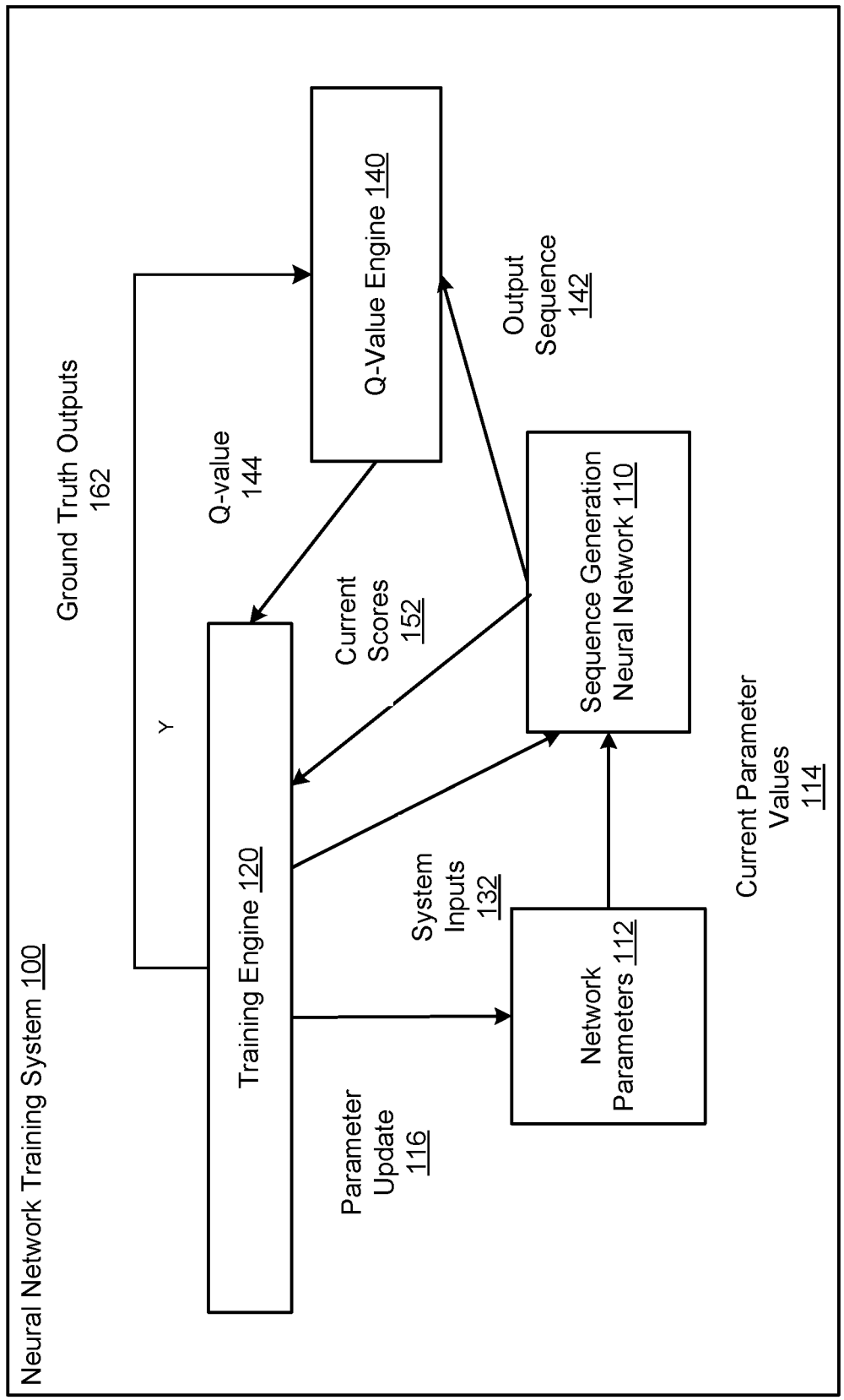
FIG. 1 shows an example neural network training system.

FIG. 1 shows an example neural network training system 100. The neural network training system 100 is an example of a system implemented as computer programs on one or more computers in one or more locations, in which the systems, components, and techniques described below are implemented.

The neural network training system 100 trains a sequence generation neural network 110 having parameters 112 (referred to in this specification as "network parameters") that generates output sequences. As described above, the sequence generation neural network 110 can be configured to generate any of a variety of output sequences conditioned on any of a variety of network inputs.

In particular, the sequence generation neural network 110 includes a decoder neural network that generates an output sequence time step by time step conditioned on the system input, i.e., either directly or through a representation of the system input generated by an encoder neural network. At each time step, the recurrent neural network is conditioned on the preceding outputs in the output sequence and the system input and generates a likelihood distribution over possible system outputs in a vocabulary of system outputs, i.e., a score distribution that includes a respective score for each possible system output in the vocabulary. The system 100 then selects the output at the time step by sampling from the likelihood distribution or selecting the highest scoring possible system output.

The sequence generation neural network can generally be any kind of neural network that generates an output defining a respective likelihood distribution over possible system outputs for each time step in an output sequence. Examples of such types of neural networks include sequence to sequence recurrent neural networks, self-attention based neural networks, and convolutional neural networks.

The system 100 trains the sequence generation neural network 110 on training data to determine trained values of the network parameters 112 from initial values of the network parameters 112 using an iterative training process.

The training data generally includes a set of training examples. Each training example includes a training network input and, for each training network input, a ground truth output sequence, i.e., the output sequence that should be generated by the sequence generation neural network 110 by processing the training network input. For example, for speech recognition, each training network input represents an utterance and the ground truth output sequence for a given training network input is a transcription of the utterance represented by the given training network input. As another example, for machine translation each training network input is text in a source language and the ground truth output sequence for a given training network input is a translation of the text in the source language into a target language.

At each iteration of the training process, a training engine 120 in the system 100 applies a parameter value update 116 to the current network parameter values 114 as of the iteration.

In particular, at each iteration, the training engine 120 or, more generally, the system 100 causes the sequence generation neural network 110 to generate a batch 142 of new output sequences in accordance with the current network parameter values 114, i.e., by processing each training network input in a batch of training network inputs 132 using the sequence generation neural network 110 and in accordance with the current parameter values 114 to map the network input to a new output sequence.

Each new output sequence in the batch includes a respective system output from a vocabulary of system outputs at each of a plurality of output positions. As described above, the neural network 110 generates an output sequence by generating a likelihood distribution over the vocabulary of system outputs at each of multiple output positions and then selecting, e.g., sampling, a system output from the vocabulary in accordance with the likelihood distribution.

A Q-value engine 140 then determines Q-values 144 for each of the new output sequences in the batch using the ground truth output sequences 162 for the training network inputs in the batch. In particular, the Q-value engine 140 generates, for each position in a given output sequence, a respective Q-value for each possible system output in the vocabulary.

The Q-value for a particular possible system output at a given position in a given output sequence is the highest possible quality score that can be assigned to any candidate output sequence that (i) begins with a prefix that includes the system outputs at positions before the given output position in the given output sequence and (ii) has the particular possible system output immediately following the prefix. That is, the candidate output sequence can have any possible suffix so long as the suffix is immediately preceded by (i) the prefix and (ii) the particular possible system output. In other words, the candidate output sequence can be any sequence of the form [p, a, s], where p is the prefix, a is the particular possible system output, and s is any suffix of zero or more possible system outputs. The quality score for a candidate output sequence measures the quality of the candidate output sequence relative to the corresponding ground truth output sequence, i.e., the ground truth output sequence for the network input from which the given output sequence was generated.

Generating Q-values is described in more detail below with reference to FIGS. 2-5.

The training engine 120 uses the Q-values 144 and the current likelihood distributions 152 generated by the neural network as part of generating the batch of new output sequences 142 to determine a parameter update 116 and then applies, e.g., adds, the update to the current values 114 of the network parameters to generate updated network parameter values. Determining the parameter update using the Q-values is described below with reference to FIG. 2.

By iteratively updating the network parameters in this manner, the system 100 can effectively train the sequence generation neural network 110 to generate high quality output sequences.

While FIG. 1 shows only a single training engine 120 communicating with a single instance of the sequence generation neural network 110, in some implementations the training process can be distributed across multiple hardware devices. In particular, to speed up the training, an asynchronous or synchronous distributed setup can be employed, where a parameter server stores the shared model parameters for a number of sequence generation neural network replicas. The training engine for each network replica asynchronously or synchronously samples a batch of sequences from its local network replica and computes the gradients described below. Then, the gradients are sent to the parameter server, which updates the shared parameters. The replicas periodically update their local parameter values with up-to-date parameters from the parameter server.

Figure 2:
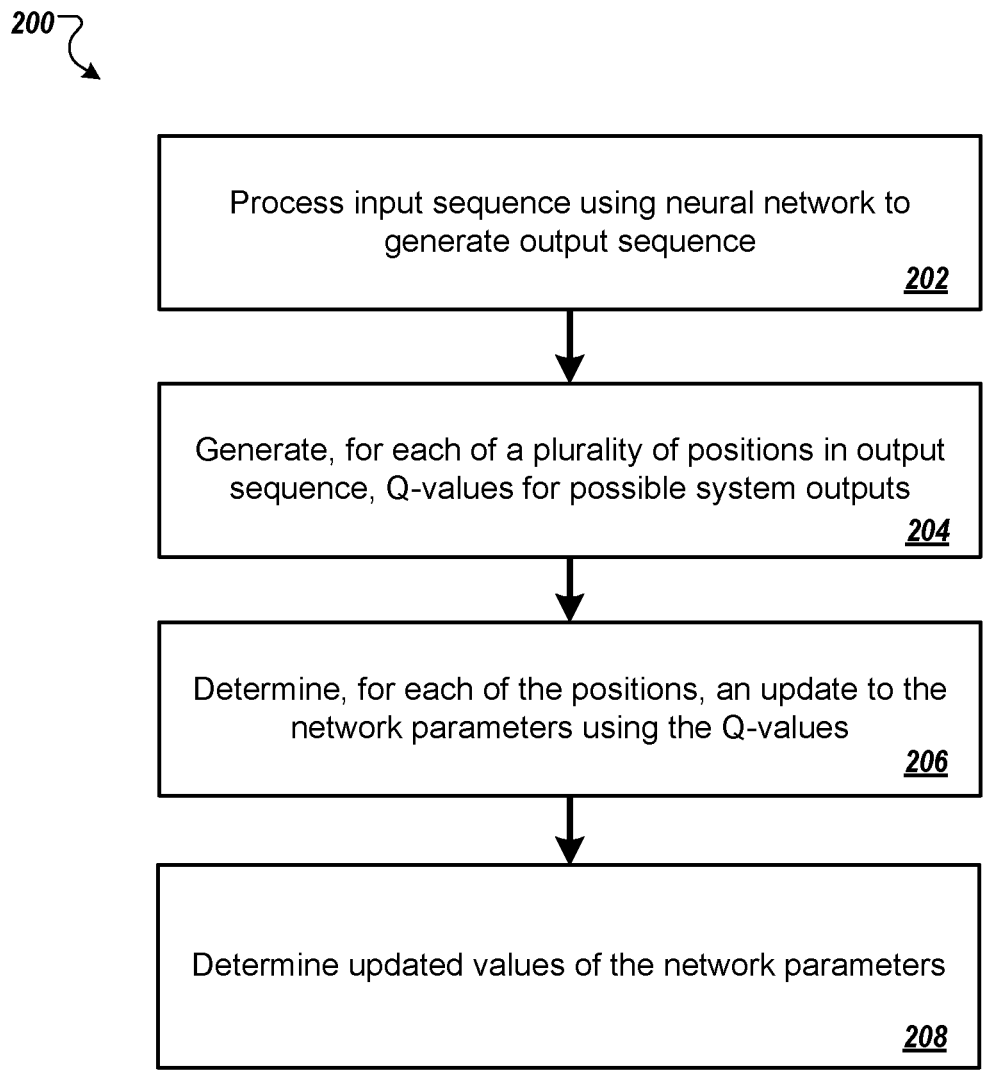
FIG. 2 is a flow chart of an example process for training of the sequence generation neural network.

FIG. 2 is a flow diagram of an example process 200 for training the sequence generation neural network system. For convenience, the process 200 will be described as being performed by a system of one or more computers located in one or more locations. For example, a neural network training system, e.g., the neural network training system 100 of FIG. 1, appropriately programmed, can perform the process 200.

The system can perform the process 200 for each training example in a batch of training examples to determine a respective parameter update for each training example in the batch. The batch generally includes a fixed number of training examples, e.g., ten, fifty, or one hundred. The system can then generate a final parameter update for the batch, e.g., by averaging or summing the parameter updates for the training examples, and then apply, e.g., add, the final parameter update to the current values of the parameters to generate updated parameter values.

The system processes the training network input in the training example using the sequence generation neural network and in accordance with the current values of the network parameters to generate a new output sequence, i.e., to map the training network input to a new output sequence (step 202). To generate the new output sequence, the system samples from the likelihood distributions generated by the sequence generation neural network, e.g., until a pre-determined end-of-sequence output token is sampled or until the sequence reaches a pre-determined maximum length.

The system generates, for each of the positions in the new output sequence, Q-values for each of the possible system outputs in the vocabulary (step 204). Generating Q-values for a given position in an output sequence is described below with reference to FIGS. 3-5.

The system determines, for each of the positions, an update to the current values of the network parameters that increases the likelihood that the neural network generates a system output at the position that has a high quality score (step 206). That is, the system generates an update that causes the neural network to be more likely to sample a system output at the position that has a high quality score.

To determine the update for a given position, the system transforms the Q-values for the possible system outputs for the given position into a target likelihood distribution over the possible system outputs in the vocabulary.

For example, the system can generate the target likelihood distribution by applying a softmax to the Q-values for the possible system outputs to generate a respective likelihood for each of the possible system outputs. In some implementations, the softmax is applied with reduced temperature.

In other words, the system can generate a likelihood for a possible system output a in the vocabulary by applying the following transformation:

$$\frac{\exp(Q^*(\tilde{y}_{<t}, a)/\tau)}{\sum_{a'} \exp(Q^*(\tilde{y}_{<t}, a')/\tau)}$$

where $Q^*(\tilde{y}_{<t}, a)$ is the Q-value for token a, the sum is over all of the tokens a' in the vocabulary, and $\tau$ is a temperature parameter. To apply the softmax with reduced temperature, the system sets the temperature parameter to a value that is between zero and one. In particular, in some implementations, the system sets the temperature parameter to a value that approaches the limit of $\tau \to 0$, i.e., a very small positive value, to result in the distribution being a "hard" distribution that has one or more very strong peaks, i.e., a distribution in which all probabilities except for those for a small fraction of the outputs in the vocabulary are approximately zero.

The system then determines the update for the given position by computing a gradient with respect to the network parameters of an objective function that depends on a divergence between the target likelihood distribution for the output position and the likelihood distribution generated by the neural network for the output position and then determining an update to the parameters from the gradient.

For example, the objective function can be a Kullback-Leibler (KL) divergence between the target likelihood distribution for the output position and the likelihood distribution generated by the neural network for the output position.

The system can determine the update to the parameters from the gradient by applying an update rule to the gradient, e.g., an rmsProp update rule, an Adam update rule, or a stochastic gradient descent update rule, that defines how the gradient is mapped to parameter value update.

The system determines an update to the current values for the training example from the updates determined for each of the plurality of positions (step 208). For example, the system can sum or average the updates at each of the positions to determine the update to the current values for the training example.

Figure 3:
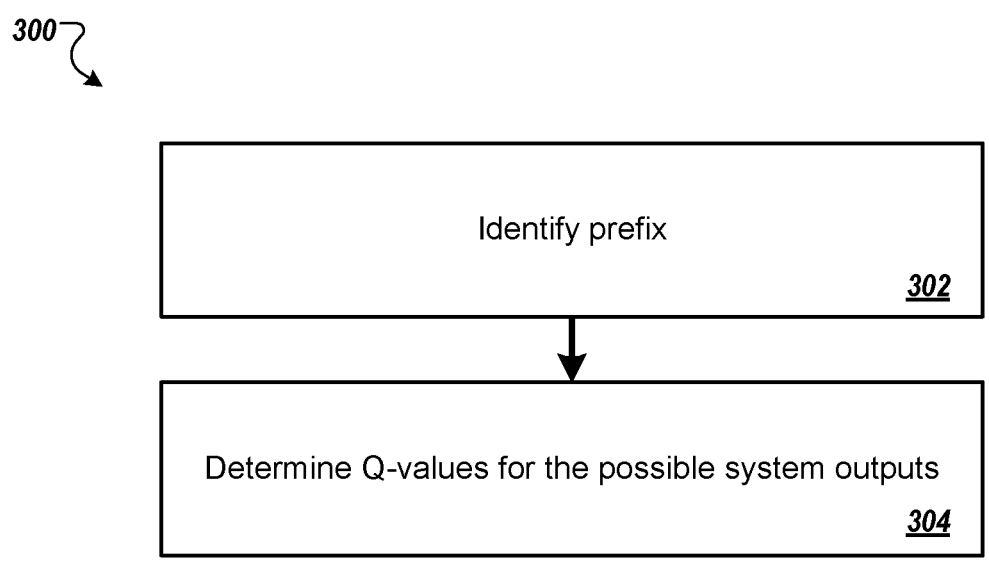
FIG. 3 is a flow chart of an example process for generating Q values for a given position in an output sequence.

FIG. 3 is a flow diagram of an example process 300 for determining Q-values for a given output position in an output sequence. For convenience, the process 300 will be described as being performed by a system of one or more computers located in one or more locations. For example, a neural network training system, e.g., the neural network training system 100 of FIG. 1, appropriately programmed, can perform the process 100.

The system can perform the process 300 for each of the output positions in an output sequence generated during the training of the sequence generation neural network.

The system identifies a prefix that includes the system outputs at positions before the particular output position in the output sequence (step 302). In other words, the system identifies, as the prefix for the position, the partial output sequence that consists of the system outputs in the output sequence at positions before the given position in the output sequence. For the first position in the output sequence, the prefix is the empty set, i.e., there are no outputs in the prefix.

The system generates, for each possible system output in the vocabulary, a respective Q-value (step 304).

In particular, the system determines the highest quality score that can be assigned to any candidate output sequence from among the group of possible candidate output sequences that include (i) the identified prefix followed by (ii) the possible system output and followed by (iii) any suffix of zero or more system outputs. That is the group of possible candidate output sequences all start with the same identified prefix followed by the same system output but all have different suffixes. The system the sets the Q-value to be the determined highest quality score.

The quality score for a given candidate output sequence measures the quality of the given candidate output sequence relative to the ground truth output sequence. That is, the quality score measures the difference between the candidate output sequence and the ground truth output sequence according to a quality metric. Generally, the metric that is used to evaluate this quality is dependent on the kinds of sequences that the neural network generates.

As a particular example, when the output sequences are natural language sequences, and the possible outputs in the vocabulary are sequences of natural language characters (optionally augmented with one or more special characters like a blank symbol that represents a space between characters and an end-of-sequence symbol that represents that the output sequence should be terminated), the metric can be based on the edit distance between the candidate output sequence and the ground truth output sequence.

The edit distance between two sequences u and v is the minimum number of insertion, deletion, and substitution edits required to convert u to v and vice versa. Thus, when the quality metric is based on the edit distance, the highest quality score that can be assigned is the quality score for the candidate output sequence that has a smallest edit distance to the ground truth output sequence.

As a particular example, the quality metric can be the negative of the edit distance or can be proportional to the inverse of one (or another positive constant) plus the edit distance.

An example of identifying edit distances is shown below with reference to FIG. 4.

A technique for efficiently identifying the highest quality score when the distance metric is based on edit distance is described below with reference to FIG. 5.

FIG. 4 shows an example of applying the OCD training technique when the quality metric is based on edit distance.

In particular, FIG. 4 shows a ground truth output sequence (referred to as a target sequence) and a new output sequence generated by the neural network (referred to as a generated sequence). In the example of FIG. 4, the ground truth output sequence is "as_he_talks_his_wife" while the new output sequence is "as_ee_talks_whose_wife."

FIG. 4 also shows, for each position in the new output sequence, the optimal extensions for edit distance, i.e., the possible system outputs that would have the highest Q values of all possible outputs for the position and, therefore, the highest probability in the target likelihood distribution generated for the position.

In the example of FIG. 4, the optimal extension for a given output position are displayed below and immediately to the left of the output at the given output position in the new output sequence.

As one particular example, for the first position in the output sequence (with output "a"), the optimal extension is "a," because the prefix for the first position is empty and an edit distance of zero can be achieved by matching the first output ("a") in the ground truth output sequence.

As another particular example, for the fifth position in the output sequence (the position at which the output sequence is "as_ee" and the prefix would be "as_e"), there are three optimal extensions, "e," "h," and "_". This is because following the prefix "as_e" with any of these three system outputs (when combined with proper suffixes) could result in a candidate output sequence that has an edit distance of one. Thus, each of these three possible system outputs will receive the same Q-value and the target likelihood distribution for the fifth position will assign each of these three possible system outputs the same likelihood.

Figure 5:
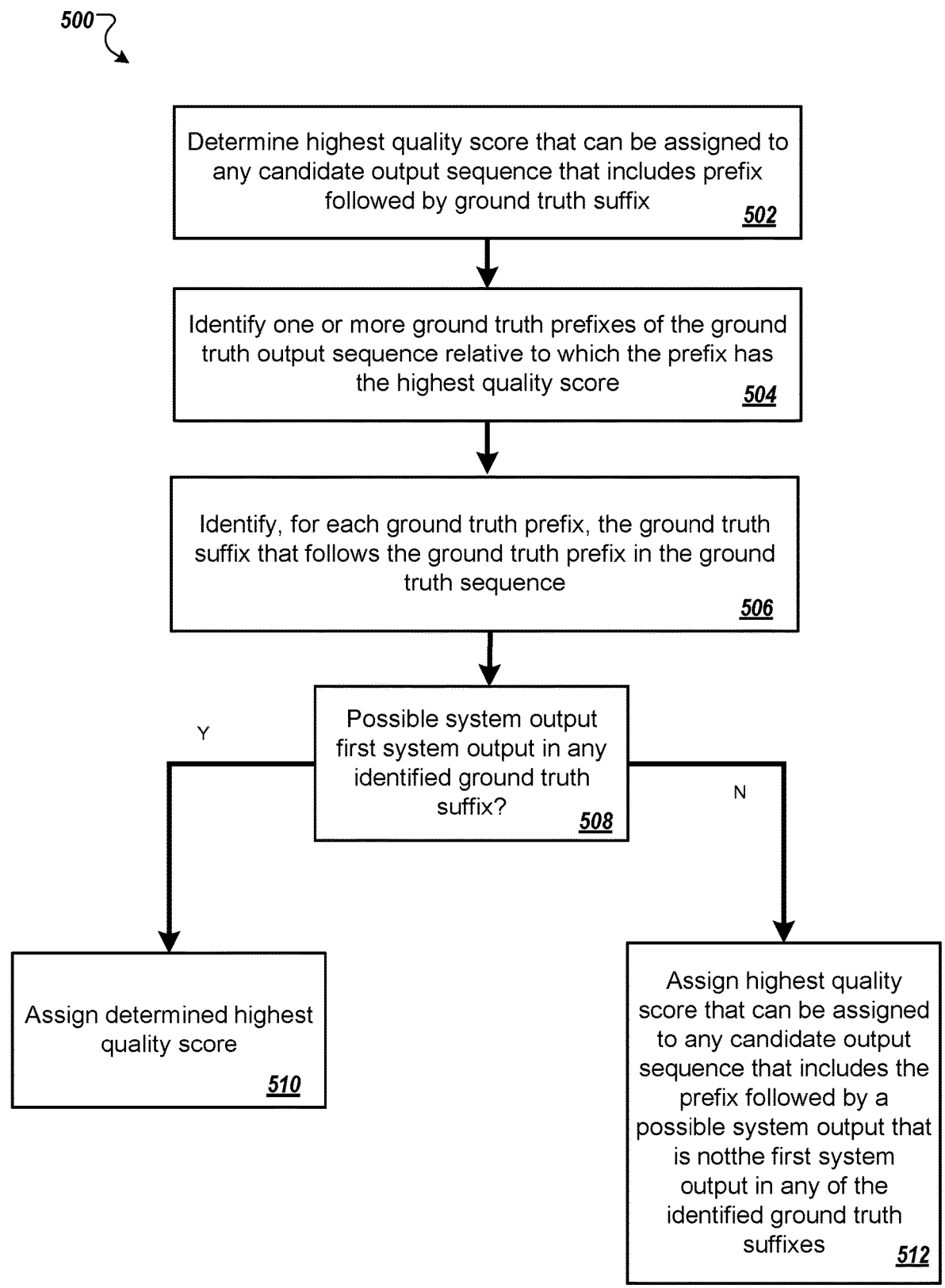
FIG. 5 is a flow chart of an example process for determining the highest quality score for a particular system output that is preceded by a particular prefix when the quality metric is based on edit distance.
Figure 6:
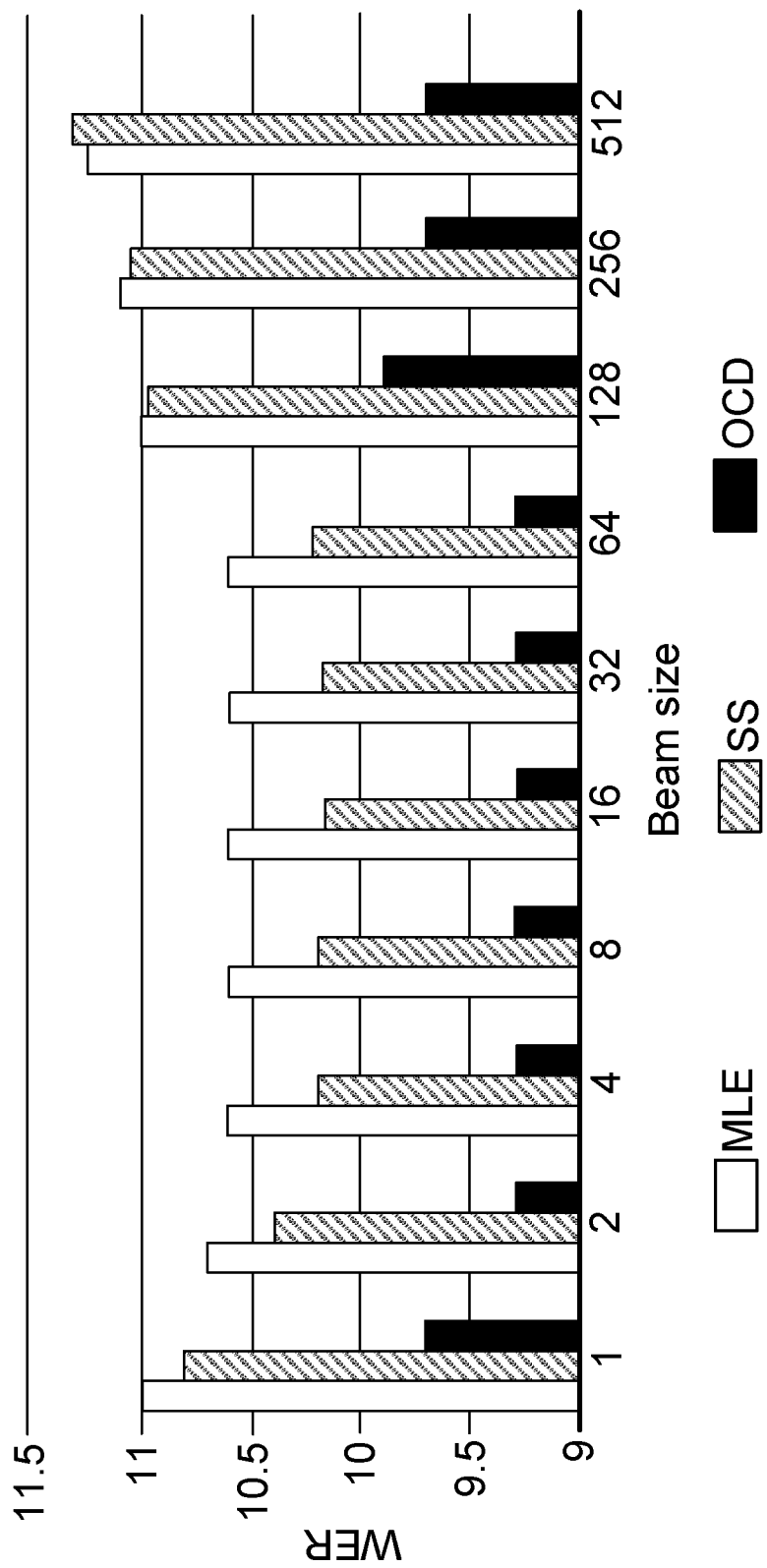
FIG. 6 shows performance differences for training a neural network using three different techniques.

FIG. 5 is a flow diagram of an example process 500 for determining the highest quality score for a particular system output that is preceded by a particular prefix when the quality metric is based on edit distance. For convenience, the process 500 will be described as being performed by a system of one or more computers located in one or more locations. For example, a neural network training system, e.g., the neural network training system 100 of FIG. 1, appropriately programmed, can perform the process 500.

In particular, the system can perform the process 500 to efficiently determine the highest quality score that can be assigned to any candidate output sequence that includes a particular prefix followed by a particular possible system output and followed by any suffix of one or more system outputs.

The system determines the highest quality score that can be assigned to any candidate output sequence that includes the particular prefix (from step 302) followed by any ground truth suffix that is part of the ground truth output sequence (step 502). In other words, given a prefix p the system determines the highest quality score that can be assigned to any candidate output sequence [p,s] that is a concatenation of the particular prefix p and any suffix s that is part of the ground truth output sequence.

The system identifies one or more ground truth prefixes of the ground truth output sequence relative to which the particular prefix has a highest quality score (step 504). In other words, the system identifies one or more ground truth prefixes of the ground truth output sequence relative to which the particular prefix has the smallest edit distance.

The system identifies, for each of the identified ground truth prefixes, a respective ground truth suffix that follows the identified ground truth prefix in the ground truth sequence (step 506).

The system determines whether the particular possible system output is a first system output in any of the identified ground truth suffixes (step 508).

If the system output is the first system output in the one or more of the identified ground truth suffixes, the system assigns, as the highest quality score for the particular possible system output, the highest quality score that can be assigned to any candidate output sequence that includes the prefix followed by any ground truth suffix that is part of the ground truth output sequence (step 510), i.e., the highest quality score determined in step 502.

If the system output is not the first system output in any of the identified ground truth suffixes, the system determines the highest quality score that can be assigned to any candidate output sequence that includes the particular prefix followed by a possible system output that is not the first system output in any of the identified suffixes and followed by any ground truth suffix that is part of the ground truth output sequence (step 512).

The system assigns, as the highest quality score for the particular possible system output, the highest quality score that can be assigned to any candidate output sequence that includes the prefix followed by a possible system output that is not a first system output in any of the identified ground truth suffixes and followed by any ground truth suffix that is part of the ground truth output sequence (step 514).

By identifying the highest quality score for possible system outputs using the process 500, the system can compute the highest quality scores using dynamic programming for every prefix and for every possible system output with a complexity of $O(|y'|*|y|+|V|*|y|)$, where $|y'|$ is the number of outputs in the ground truth sequence, $|y|$ is the number of outputs in the generated output sequence, and $|V|$ is the number of outputs in the vocabulary. Thus, the system can perform this search for quality scores without bottlenecking the training process, i.e., without significantly impacting the running time of a given training iteration.

The process 500 is depicted as pseudo-code of a dynamic programming algorithm in Table 2, below. In particular the pseudo-code in Table 2 refers to the ground truth sequence as the reference sequence r and the new output sequence as the hypothesis sequence h.

TABLE 2

Procedure 1 EditDistanceQ op returns Q-values of the tokens at each time step based on the minimum edit distance between a reference sequence r and a hypothesis sequence h of length t.

```
1:     for j in (0..t) do
2:         dⱼ ← j + 1
3:     for i in (1..t) do
4:         minDist ← i
5:         subCost ← i - 1
6:         insCost ← i + 1
7:         for j in (0..t - 1) do
8:             if hᵢ₋₁ = rⱼ then
9:                 repCost ← 0
10:            else
11:                repCost ← 1
12:            cheapest ← min(subCost + repCost, dⱼ + 1, insCost)
13:            subCost ← dⱼ
14:            insCost ← cheapest + 1
15:            dⱼ ← cheapest
16:            if dⱼ < minDist then
17:                minDist ← dⱼ
18:        if minDist = i then
19:            Q_{i,r₁} ← 1
20:        for j in (1..t) do
21:            if dⱼ = minDist then
22:                Q_{i,r_{j+1}} ← 1
23:        for all tokens k do
24:            Q_{i,k} ← Q_{i,k} - 1 - minDist
       return Q
```

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of network parameters and being configured to map a system input to an output sequence comprising a plurality of system outputs, wherein the method comprises:
   obtaining a batch of training examples, each training example comprising a training network input and, for each training network input, a ground truth output sequence;
   for each of the training examples:
      processing the training network input in the training example using the neural network and in accordance with current values of the network parameters to map the training network input to an output sequence comprising a respective system output from a vocabulary of possible system outputs at each of a plurality of output positions, comprising, for each of the plurality of output positions, generating a likelihood distribution over the possible system outputs in the vocabulary and selecting the system output at the output position using the likelihood distribution;
      for each particular output position of the plurality of output positions in the output sequence:
         identifying a prefix that includes the system outputs at positions before the particular output position in the output sequence,
         for each possible system output in the vocabulary, determining a highest quality score that can be assigned to any candidate output sequence that includes the prefix followed by the possible system output and followed by any suffix of one or more system outputs, wherein the quality score measures a quality of a candidate output sequence relative to the ground truth output sequence,
         generating a target likelihood distribution for the particular output position from the highest quality sores for the possible system outputs, and
         determining an update to the current values of the network parameters based on a gradient with respect to the network parameters of an objective function that depends on a divergence between the target likelihood distribution for the particular output position and the likelihood distribution generated by the neural network for the particular output position; and
      determining updated values of the network parameters from the updates for the particular output positions in the output sequences generated by the neural network for the batch of training examples.

2. The method of claim 1, further comprising:
   outputting the trained neural network for use in mapping new network inputs to new output sequences.

3. The method of claim 1, wherein generating the target likelihood distribution comprises applying a softmax to the highest quality scores for the possible system outputs to generate a respective likelihood for each of the possible system outputs.

4. The method of claim 3, wherein the softmax is applied with reduced temperature.

5. The method of claim 1, wherein the possible system outputs in the vocabulary comprise tokens in a natural language.

6. The method of claim 1, wherein the quality score is based on the edit distance between the candidate output sequence and the ground truth output sequence, and wherein the highest quality score that can be assigned is the quality score for the candidate output sequence that has a smallest edit distance to the ground truth output sequence.

7. The method of claim 1, wherein determining a highest quality score that can be assigned to any candidate output sequence that includes the prefix followed by the possible system output and followed by any suffix of one or more system outputs comprises:
   determining a highest quality score that can be assigned to any candidate output sequence that includes the prefix followed by any ground truth suffix that is part of the ground truth output sequence;
   identifying one or more ground truth prefixes of the ground truth output sequence relative to which the prefix has a highest quality score,
   identifying, for each of the identified ground truth prefixes, a respective ground truth suffix that follows the identified ground truth prefix in the ground truth sequence, and
   when the possible system output is a first system output in any of the identified ground truth suffixes, assigning as the highest quality score for the possible system output the highest quality score that can be assigned to any candidate output sequence that includes the prefix followed by any ground truth suffix that is part of the ground truth output sequence.

8. The method of claim 7, wherein determining a highest quality score that can be assigned to any candidate output sequence that includes the prefix followed by the possible system output and followed by any suffix of one or more system outputs comprises:
   determining a highest quality score that can be assigned to any candidate output sequence that includes the prefix followed by a possible system output that is not a first system output in any of the identified suffixes and followed by any ground truth suffix that is part of the ground truth output sequence;
   when the possible system output is not the first system output in any of the identified ground truth suffixes, assigning as the highest quality score for the possible system output the highest quality score that can be assigned to any candidate output sequence that includes the prefix followed by a possible system output that is not a first system output in any of the identified ground truth suffixes and followed by any ground truth suffix that is part of the ground truth output sequence.

9. A system comprising one or more computers and one or more storage devices storing instructions that when executed by the one or more computers cause the one or more computers to perform operations for training a neural network having a plurality of network parameters and being configured to map a system input to an output sequence comprising a plurality of system outputs, the operations comprising:

obtaining a batch of training examples, each training example comprising a training network input and, for each training network input, a ground truth output sequence;

for each of the training examples:
  processing the training network input in the training example using the neural network and in accordance with current values of the network parameters to map the training network input to an output sequence comprising a respective system output from a vocabulary of possible system outputs at each of a plurality of output positions, comprising, for each of the plurality of output positions, generating a likelihood distribution over the possible system outputs in the vocabulary and selecting the system output at the output position using the likelihood distribution;
  for each particular output position of the plurality of output positions in the output sequence:
    identifying a prefix that includes the system outputs at positions before the particular output position in the output sequence,
    for each possible system output in the vocabulary, determining a highest quality score that can be assigned to any candidate output sequence that includes the prefix followed by the possible system output and followed by any suffix of one or more system outputs, wherein the quality score measures a quality of a candidate output sequence relative to the ground truth output sequence,
    generating a target likelihood distribution for the particular output position from the highest quality sores for the possible system outputs, and
    determining an update to the current values of the network parameters based on a gradient with respect to the network parameters of an objective function that depends on a divergence between the target likelihood distribution for the particular output position and the likelihood distribution generated by the neural network for the particular output position; and
  determining updated values of the network parameters from the updates for the particular output positions in the output sequences generated by the neural network for the batch of training examples.

10. The system of claim 9, wherein generating the target likelihood distribution comprises applying a softmax to the highest quality scores for the possible system outputs to generate a respective likelihood for each of the possible system outputs.

11. The system of claim 10, wherein the softmax is applied with reduced temperature.

12. The system of claim 9, wherein the possible system outputs in the vocabulary comprise tokens in a natural language.

13. The system of claim 9, wherein the quality score is based on the edit distance between the candidate output sequence and the ground truth output sequence, and wherein the highest quality score that can be assigned is the quality score for the candidate output sequence that has a smallest edit distance to the ground truth output sequence.

14. The system of claim 9, wherein determining a highest quality score that can be assigned to any candidate output sequence that includes the prefix followed by the possible system output and followed by any suffix of one or more system outputs comprises:
  determining a highest quality score that can be assigned to any candidate output sequence that includes the prefix followed by any ground truth suffix that is part of the ground truth output sequence;
  identifying one or more ground truth prefixes of the ground truth output sequence relative to which the prefix has a highest quality score,
  identifying, for each of the identified ground truth prefixes, a respective ground truth suffix that follows the identified ground truth prefix in the ground truth sequence, and
  when the possible system output is a first system output in any of the identified ground truth suffixes, assigning as the highest quality score for the possible system output the highest quality score that can be assigned to any candidate output sequence that includes the prefix followed by any ground truth suffix that is part of the ground truth output sequence.

15. The system of claim 14, wherein determining a highest quality score that can be assigned to any candidate output sequence that includes the prefix followed by the possible system output and followed by any suffix of one or more system outputs comprises:
  determining a highest quality score that can be assigned to any candidate output sequence that includes the prefix followed by a possible system output that is not a first system output in any of the identified suffixes and followed by any ground truth suffix that is part of the ground truth output sequence;
  when the possible system output is not the first system output in any of the identified ground truth suffixes, assigning as the highest quality score for the possible system output the highest quality score that can be assigned to any candidate output sequence that includes the prefix followed by a possible system output that is not a first system output in any of the identified ground truth suffixes and followed by any ground truth suffix that is part of the ground truth output sequence.

16. One or more non-transitory computer-readable storage media storing instructions that when executed by one or more computers cause the one or more computers to perform operations for training a neural network having a plurality of network parameters and being configured to map a system input to an output sequence comprising a plurality of system outputs, the operations comprising:
  obtaining a batch of training examples, each training example comprising a training network input and, for each training network input, a ground truth output sequence;
  for each of the training examples:
    processing the training network input in the training example using the neural network and in accordance with current values of the network parameters to map the training network input to an output sequence comprising a respective system output from a vocabulary of possible system outputs at each of a plurality of output positions, comprising, for each of the plurality of output positions, generating a likelihood distribution over the possible system outputs in the vocabulary and selecting the system output at the output position using the likelihood distribution;
    for each particular output position of the plurality of output positions in the output sequence:
      identifying a prefix that includes the system outputs at positions before the particular output position in the output sequence,
      for each possible system output in the vocabulary, determining a highest quality score that can be assigned to any candidate output sequence that includes the prefix followed by the possible system output and followed by any suffix of one or more system outputs, wherein the quality score measures a quality of a candidate output sequence relative to the ground truth output sequence, generating a target likelihood distribution for the particular output position from the highest quality sores for the possible system outputs, and determining an update to the current values of the network parameters based on a gradient with respect to the network parameters of an objective function that depends on a divergence between the target likelihood distribution for the particular output position and the likelihood distribution generated by the neural network for the particular output position; and determining updated values of the network parameters from the updates for the particular output positions in the output sequences generated by the neural network for the batch of training examples.

17. The non-transitory computer-readable storage media of claim 16, wherein generating the target likelihood distribution comprises applying a softmax to the highest quality scores for the possible system outputs to generate a respective likelihood for each of the possible system outputs.

18. The non-transitory computer-readable storage media of claim 16, wherein the quality score is based on the edit distance between the candidate output sequence and the ground truth output sequence, and wherein the highest quality score that can be assigned is the quality score for the candidate output sequence that has a smallest edit distance to the ground truth output sequence.

19. The non-transitory computer-readable storage media of claim 16, wherein determining a highest quality score that can be assigned to any candidate output sequence that includes the prefix followed by the possible system output and followed by any suffix of one or more system outputs comprises:

determining a highest quality score that can be assigned to any candidate output sequence that includes the prefix followed by any ground truth suffix that is part of the ground truth output sequence;

identifying one or more ground truth prefixes of the ground truth output sequence relative to which the prefix has a highest quality score, identifying, for each of the identified ground truth prefixes, a respective ground truth suffix that follows the identified ground truth prefix in the ground truth sequence, and when the possible system output is a first system output in any of the identified ground truth suffixes, assigning as the highest quality score for the possible system output the highest quality score that can be assigned to any candidate output sequence that includes the prefix followed by any ground truth suffix that is part of the ground truth output sequence.

20. The non-transitory computer-readable storage media of claim 19, wherein determining a highest quality score that can be assigned to any candidate output sequence that includes the prefix followed by the possible system output and followed by any suffix of one or more system outputs comprises:

determining a highest quality score that can be assigned to any candidate output sequence that includes the prefix followed by a possible system output that is not a first system output in any of the identified suffixes and followed by any ground truth suffix that is part of the ground truth output sequence;

when the possible system output is not the first system output in any of the identified ground truth suffixes, assigning as the highest quality score for the possible system output the highest quality score that can be assigned to any candidate output sequence that includes the prefix followed by a possible system output that is not a first system output in any of the identified ground truth suffixes and followed by any ground truth suffix that is part of the ground truth output sequence.

* * * * *